UNITED STATES PATENT OFFICE.

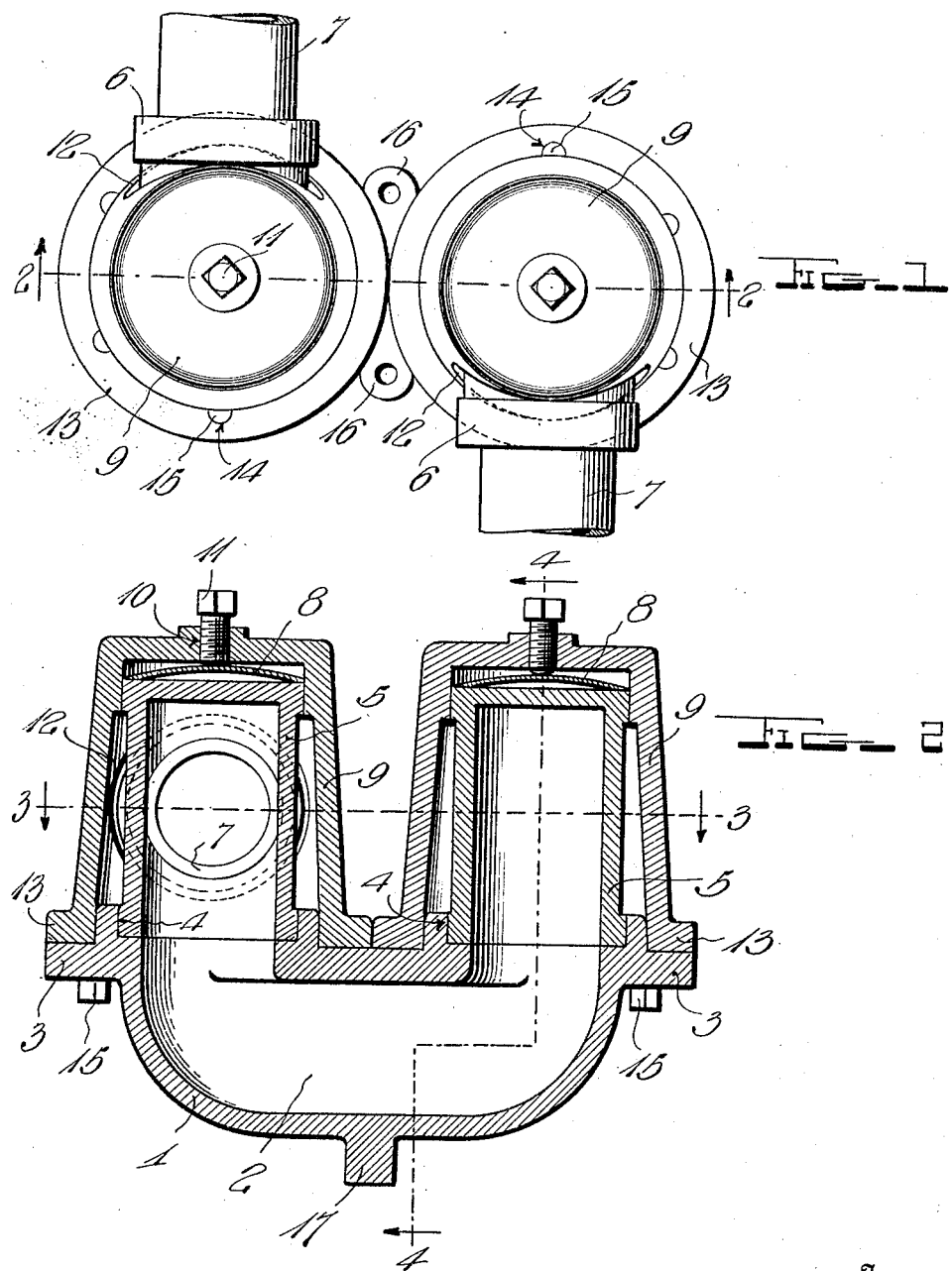

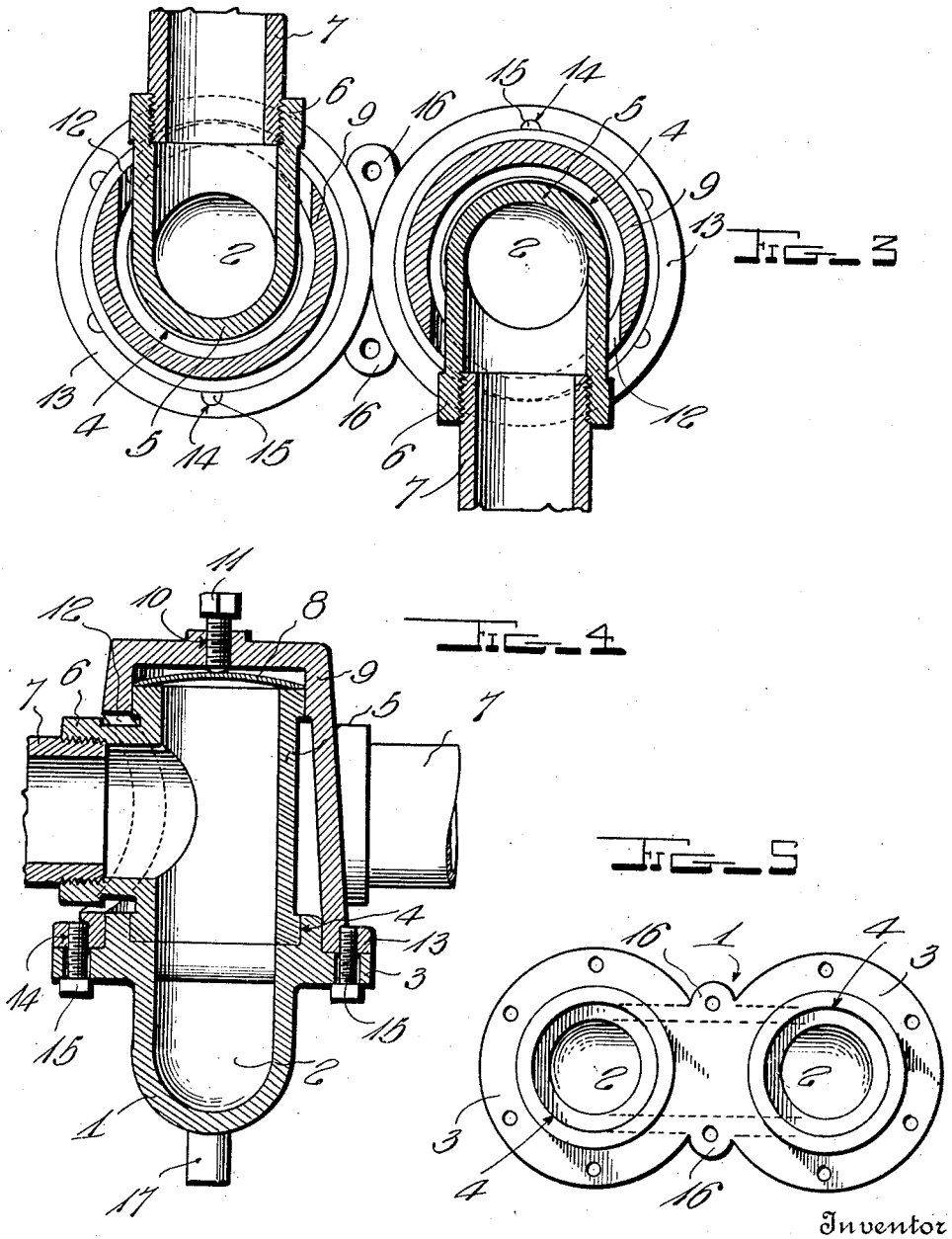

SAMUEL SHERIFF, OF SALT LAKE CITY, UTAH.

EXPANSION-JOINT FOR PIPES.

1,400,465.

Specification of Letters Patent.

Patented Dec. 13, 1921.

Application filed July 6, 1920. Serial No. 394,048.

*To all whom it may concern:*

Be it known that I, SAMUEL SHERIFF, a citizen of the United States, residing at Salt Lake City, in the County of Salt Lake and State of Utah, have invented certain new and useful Improvements in Expansion-Joints for Pipes; and I do declare the following to be a full, clear, and exact description of the invention, such as will enable others skilled in the art to which it appertains to make and use the same.

This invention relates to improvements in expansion joints for pipes.

The principal object of the invention is to generally improve upon devices of this class by simplifying the construction and consequently reducing the cost of manufacture and producing a joint which is extremely effective in operation and in which the employment of packing is unnecessary.

Another object of the invention is to provide a joint of the above mentioned type which comprises a conduit provided at its ends with seats on which members are rotatably mounted, each of the latter being inclosed within a housing, and there being novel means between the latter and the members to force them into tight contact with said seats, thus making it possible to take up wear and prevent possible leakage.

A further object of the invention is to provide a joint including housings which are provided with openings for passage of the pipes, these housings being rotatably mounted so as to permit them to be moved to the desired positions to accommodate the pipes regardless of whether they are laid in parallelism or not.

Other objects and advantages of the invention will be apparent during the course of the following description.

In the accompanying drawings forming a part of this specification and in which like numerals are employed to designate like parts throughout the same:

Figure 1 is a top plan view of an expansion joint constructed in accordance with my invention.

Fig. 2 is a central vertical sectional view taken on the line 2—2 of Fig. 1.

Fig. 3 is a horizontal section taken on the line 3—3 of Fig. 2.

Fig. 4 is a vertical section taken on the line 4—4 of Fig. 2.

Fig. 5 is a detail plan view of the body member or conduit.

Referring to the drawings wherein the preferred embodiment of my invention is shown, the numeral 1 designates a body member provided with a passage 2 which extends therethrough. This member is provided adjacent its top with annular attaching flanges 3, the purpose of which will hereinafter be described. Also arranged at the top of this member and at the opposite ends of the passage 2 are seats 4 on which the cylindrical members 5 are rotatably mounted. These members 5 are open at their lower ends to permit passage of water therethrough and are provided in one side with internally screw-threaded necks 6 to which the pipes 7 are connected. These pipes under ordinary circumstances extend in parallelism with one another but in case of expansion or contraction due to the heated or cold fluids which pass therethrough, they assume various angles with respect to one another. By connecting them to the rotary member 5, such angling is permitted.

Constant rotation of the members 5 against their seats 4 will cause wear which may possibly permit leakage of the fluid. To insure tight contact between these members and their seats I provide novel means. This means is in the form of spring metal disks 8 which are arranged on the upper closed ends of the members between the latter and the housings 9 which inclose them. The tops of the housings are equipped with screw-threaded holes 10 through which set screws 11 extend, the inner ends of the latter bearing against the disks 8 and serving to permit the lower ends of the members 5 to be forced into tight engagement with their seats. The housings referred to may be of any suitable form. However, I prefer to employ cup-shaped members for the purpose, each of these cups being provided at one side with an opening 12 to permit passage of the necks 6 therethrough. The housings 9 are provided at their upper ends with internal enlargements which are well machined and in which the upper ends of members 5 rotate. These enlargements serve as guides and retain the members 5 in position at all times. The contact between the latter and the enlargements is tight enough to insure against leakage. These housings are provided at their lower ends with annular flanges 13 which rest on the corresponding annular flanges 3 of the body member 1. The flanges 13 are provided with screw-threaded openings 14 into which bolts 15 are tapped to retain them together with the flanges 3 and to permit the housings to be removed or rotated whenever desired. Particular emphasis is to be laid on this construction, because by providing separate housings for the members 5 and mounting these housings in such a manner as to permit them to be rotated, the joint may be effectively used in connection with pipes regardless of the angles at which they lie with respect to each other. Assuming that one of the pipes is arranged at right angles to the body member 1, and the other pipe is arranged in diagonal relation thereto, it will be necessary to rotate the housings with which the first named pipe co-acts in order to bring the opening 12 therein to the proper place to permit passage of the pipe therethrough for connection with the rotary member 5 therein.

The device need not be placed at every point of connection of two pipes, but may be arranged at any desired intervals. Assuming that the pipes are parallel with one another, the joint will take the position shown in Fig. 1, in which position the neck 6 of one of the rotary members extends in an opposite direction to the like neck of the other rotary member. When the parts are in this position, one pipe is connected to one of the necks while the other pipe is connected to the other neck, thus off-setting the two pipes and permitting them to assume various angles without bursting as they sometimes do when caused to lengthen and shorten due to expansion and contraction. Should one of the pipes be moved out of parallelism with the other pipe because of the expansion or contraction to which it is subjected, the member to which it is connected will readily rotate about its seat and permit such angling of the pipes. As before stated, the rotary members may be at all times retained in effective engagement with their seats by adjusting the set screws 11 against the disks 8 which in turn force the members. At this point I desire to mention that these seats will be ground in actual practice, to obviate the necessity of employing packing and at the same time provide an effective joint which will not leak.

If desired, the body member may include oppositely disposed apertured ears 16 which serve to permit it to be suspended by suitable means from the ceiling or other place. It may also include a depending lug or leg 17 for the purpose of supporting it on the surface or floor.

From the foregoing description and drawings it will be seen that I have perfected an extremely advantageous expansion joint for pipes which will permit the use of all kinds of pipes with it and which is of such construction that it will permit the pipes to become angled as they do owing to the expansion and contraction to which they are subjected. The construction is exceedingly simple and few inexpensive parts are employed, consequently, the cost of manufacture of the device is comparatively small. The effectiveness of the device is decidedly increased by the employment of the detachably and rotatably mounted independent housings, which are rotated for the purpose already set forth. The effectiveness is also increased by the employment of means for taking up wear of the rotary members and seats which will occur following constant use of the device. Not only does the device possess the foregoing advantages, but it also includes means for supporting it on the surface or suspending it from a suitable support which means oftentimes may be found advantageous.

A careful consideration of the foregoing description taken in connection with the accompanying drawings will enable persons skilled in the art to which this invention relates to obtain a clear understanding of the same, therefore, further description is deemed unnecessary.

Since probably the best results will be obtained with the construction shown and described, this construction is to be taken as a preferred form of the invention. However, various minor changes in the shape, size, and arrangement of parts may be resorted to without departing from the spirit of the invention or the scope of the subjoined claims.

I claim:

1. An expansion joint for pipes comprising a body having a passage therethrough, at the opposite ends of which are seats, a pair of tubular members, said members being closed at their upper ends and being rotatably mounted on the aforesaid seats, said members including means for attachment of pipes, means for housing said members, said means being fixedly connected with said body, and co-acting means between said housing means and the upper ends of said members for forcing the latter tightly against said seats but permitting rotary movement thereof.

2. An expansion joint for pipes comprising a body provided with a fluid passage, at the opposite ends of which are seats, rotary members engageable with said seats, said members being provided with means for connection of pipes, means for housing said members, spring-disks arranged between the upper ends of said members and corresponding ends of said housing, and set-screws passing through said housing means and bearing on said spring-disks.

3. An expansion joint comprising a body provided with a passage extending therethrough, members rotatably mounted on the body and communicating with the passage, said members being provided with means for connection of the pipes, housings for said members provided with openings for passage of the pipes, and means securing said housings to said body for rotary adjustment around said members, whereby the openings in the housings may be positioned at any place to permit the pipes to assume various angles with respect to one another.

4. An expansion joint for pipes comprising a body having a passage therethrough, at the opposite ends of which are seats, tubular members, closed at their tops and rotatably mounted on the seats, said members including means for attachment of the pipes, cup-shaped housings for the members carried by said body, being provided in their tops with screw-threaded holes, spring metal disks arranged on top of said members, and set-screws passing through said holes and engaging said disks.

In testimony whereof I have hereunto set my hand.

SAMUEL SHERIFF.